(12) United States Patent
Yoon et al.

(10) Patent No.: US 10,062,380 B2
(45) Date of Patent: Aug. 28, 2018

(54) AUTO DIALING SYSTEM AND COMPUTER READABLE RECORDING MEDIUM THAT STORES PROGRAM FOR EXECUTING AUTO DIALING METHOD

(71) Applicant: HYUNDAI MOTOR COMPANY, Seoul (KR)

(72) Inventors: Hyunjin Yoon, Suwon-si (KR); Kyu Seop Bang, Suwon-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 15/210,181

(22) Filed: Jul. 14, 2016

(65) Prior Publication Data

US 2017/0116984 A1    Apr. 27, 2017

(30) Foreign Application Priority Data

Oct. 23, 2015    (KR) .................. 10-2015-0148268

(51) Int. Cl.
*G06F 3/041*    (2006.01)
*G10L 15/22*    (2006.01)
(Continued)

(52) U.S. Cl.
CPC ............ *G10L 15/22* (2013.01); *H04M 1/271* (2013.01); *H04M 3/02* (2013.01);
(Continued)

(58) Field of Classification Search
CPC ...... G06F 3/041; G10L 15/22; H04L 61/1594
(Continued)

(56) References Cited

U.S. PATENT DOCUMENTS 6,882,641 B1 * 4/2005 Gallick ............... H04M 3/5191
                                                                370/252
8,280,913 B2 * 10/2012 Bergin .................. G06Q 10/10
                                                                707/793
(Continued)

FOREIGN PATENT DOCUMENTS

JP    2010-074472    4/2010
KR   10-2003-0050151 A    6/2003
(Continued)

*Primary Examiner* — Seong Ah A Shin
(74) *Attorney, Agent, or Firm* — McDermott Will & Emery LLP

(57) ABSTRACT

An automatic dialing system includes a telephone directory database configured to store first terminal information which includes a first telephone directory and first identification information and second terminal information which includes a second telephone directory and second identification information. An instruction receiving unit is configured to receive a dialing instruction. A telephone directory search unit is configured to search for a telephone directory. A mobile device connection unit is configured to connect the second mobile device corresponding to the automatic dialing system, when the found telephone directory corresponds with the second telephone directory. A dialing control unit is configured to dial a phone number corresponding to the received instruction through the second mobile device, when the found telephone directory corresponds with the second telephone directory.

9 Claims, 3 Drawing Sheets

(51) Int. Cl.
  *H04M 3/02* (2006.01)
  *H04M 3/42* (2006.01)
  *H04M 1/27* (2006.01)
  *H04M 3/44* (2006.01)
  *H04L 29/12* (2006.01)
  *H04M 1/2745* (2006.01)

(52) U.S. Cl.
  CPC ......... *H04M 3/42263* (2013.01); *H04M 3/44* (2013.01); *G10L 2015/223* (2013.01); *H04L 61/1594* (2013.01); *H04M 1/274516* (2013.01)

(58) Field of Classification Search
  USPC .................. 704/251; 455/41.3, 563; 345/173
  See application file for complete search history.

(56) References Cited

U.S. PATENT DOCUMENTS

| | | | | |
|---|---|---|---|---|
| 2004/0152493 A1* | 8/2004 | Phillips | ................ | G08B 27/005 455/567 |
| 2005/0135573 A1* | 6/2005 | Harwood | ............ | H04M 1/6091 379/88.03 |
| 2006/0140379 A1* | 6/2006 | Yamamoto | ............ | H04M 1/578 379/215.01 |
| 2012/0069131 A1* | 3/2012 | Abelow | ................ | G06Q 10/067 348/14.01 |
| 2013/0106750 A1* | 5/2013 | Kurosawa | ............... | G06F 3/041 345/173 |
| 2013/0288606 A1* | 10/2013 | Kirsch | ................ | H04M 1/6091 455/41.3 |
| 2016/0255015 A1* | 9/2016 | Hrabak | ................ | H04L 47/805 455/41.2 |
| 2018/0032526 A1* | 2/2018 | Cudak | ................ | G06F 17/3053 |

FOREIGN PATENT DOCUMENTS

| | | |
|---|---|---|
| KR | 10-2003-0084456 A | 11/2003 |
| KR | 10-2004-0066957 A | 7/2004 |
| KR | 10-2013-0037017 A | 4/2013 |
| KR | 10-2013-0124049 A | 11/2013 |
| KR | 10-2013-0141203 A | 12/2013 |

\* cited by examiner

FIG. 2

| Mobile device | Telephone directory | | MAC address |
|---|---|---|---|
| | Name | Phone number | |
| A | ○○○ | 010-9999-8888 | AA:BB:CC:DD:EE:FF |
| | △△△ | 010-8888-7777 | |
| | ⋮ | ⋮ | |
| B | ○△○ | 010-7777-8888 | GG:HH:OO:KK:MM:NN |
| | △△○ | 010-8888-6666 | |
| | ⋮ | ⋮ | |

AUTO DIALING SYSTEM AND COMPUTER READABLE RECORDING MEDIUM THAT STORES PROGRAM FOR EXECUTING AUTO DIALING METHOD

CROSS-REFERENCE TO RELATED APPLICATION

This application claims the benefit of priority to Korean Patent Application No. 10-2015-0148268 filed in the Korean Intellectual Property Office on Oct. 23, 2015, the entire content of which is incorporated herein by reference.

TECHNICAL FIELD

The present disclosure relates to an automatic dialing system for automatically dialing a phone number according to a driver's instruction from a telephone directory that is stored in a plurality of mobile devices, and an automatic dialing method for the same.

BACKGROUND

A voice dialing system for a vehicle is connected to a driver's mobile device through a communication network and automatically performs dialing through the mobile device according to a driver's voice instruction recognition result. In this case, the voice dialing system searches for and dials a phone number corresponding to the voice instruction recognition result from a telephone directory that is stored in the mobile device.

Therefore, in order for a driver having a plurality of mobile devices to use such a voice dialing system, a first mobile device, in which a dialing phone number is stored, has to be selected and connected to the voice dialing system. Further, in order to use the dialing phone number stored in a second mobile device, the connection of the first mobile device to the voice dialing system has to be released so that the second mobile device can be connected to the automatic dialing system. Thereby, the driver may feel inconvenience due to time consumed in connecting the mobile devices, and an accident risk may increase while driving.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide an automatic dialing system capable of dialing a phone number according to a driver's instruction from a telephone directory that is stored in a plurality of mobile devices.

According to an exemplary embodiment in the present disclosure, an automatic dialing system, which is connected to a first mobile device of a plurality of mobile devices including the first mobile device and a second mobile device, includes a telephone directory database configured to store first terminal information including a first telephone directory and first identification information corresponding to the first mobile device and second terminal information including a second telephone directory and second identification information corresponding to the second mobile device. An instruction receiving unit is configured to receive a dialing instruction. A telephone directory search unit is configured to search for a telephone directory based on the received instruction. A mobile device connection unit is configured to connect the second mobile device to the automatic dialing system, when the found telephone directory corresponds with the second telephone directory. A dialing control unit is configured to dial a phone number corresponding to the received instruction through the second mobile device, when the found telephone directory corresponds with the second telephone directory.

The instruction receiving unit may receive a driver's voice instruction and perform voice recognition.

The mobile device connection unit may connect the second mobile device to the automatic dialing system through a communication network based on the second identification information, when the found telephone directory corresponds with the second telephone directory.

The first identification information and the second identification information may include a media access control (MAC) addresses.

The dialing control unit may dial a phone number corresponding to the received instruction through the first mobile device, when the found telephone directory corresponds with the first telephone directory.

The automatic dialing system may further include a dialing guide unit that outputs connection information of the second mobile device and dialing information as a reception result of the instruction, when the found telephone directory corresponds with the second telephone directory.

According to another embodiment in the present disclosure, a non-transitory computer readable recording medium that stores a program having instructions that, when executed by a processor, performs an automatic dialing method using an automatic dialing system that is connected to a first mobile device of a plurality of mobile devices, which include the first mobile device and a second mobile device, by causing the processor to perform steps comprising: storing first terminal information including a first telephone directory and first identification information corresponding to the first mobile device and second terminal information including a second telephone directory and second identification information corresponding to the second mobile device; receiving a dialing instruction; searching for a telephone directory based on the received instruction; connecting the second mobile device to the automatic dialing system, when the found telephone directory corresponds with the second telephone directory; and dialing a phone number corresponding to the received instruction through the second mobile device, when the found telephone directory corresponds with the second telephone directory.

The step of receiving may include receiving and recognizing a driver's voice instruction.

The step of connecting the mobile device may include connecting the second mobile device to the automatic dialing system based on the second identification information, when the found telephone directory corresponds with the second telephone directory.

The first identification information and the second identification information may include media access control (MAC) addresses.

The step of dialing may include dialing a phone number corresponding to the received instruction through the first mobile device, when the found telephone directory corresponds with the first telephone directory.

The non-transitory computer readable recording medium may further include: outputting connection information of the second mobile device and dialing information as a reception result of the instruction, when the found telephone directory corresponds with the second telephone directory.

According to the exemplary embodiments in the present disclosure, by automatically searching for and connecting a mobile device based on a driver's instruction without manually connecting a plurality of mobile devices to the automatic dialing system, automatically dialing to a phone number according to the driver's instruction can be performed.

BRIEF DESCRIPTION OF THE DRAWINGS

FIG. 2 is a diagram illustrating a telephone directory database according to an exemplary embodiment in the present disclosure.

DETAILED DESCRIPTION OF THE EMBODIMENTS

Figure 1:
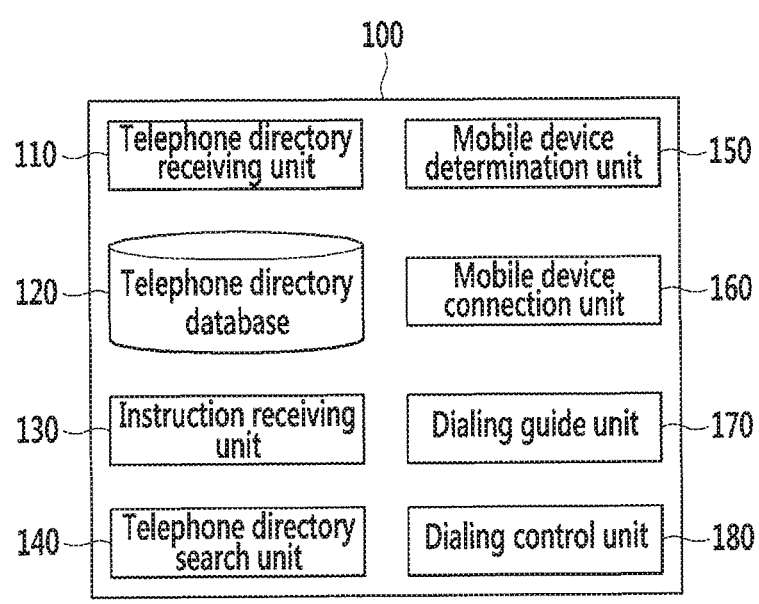
FIG. 1 is a block diagram illustrating a configuration of an automatic dialing system according to an exemplary embodiment in the present disclosure.

Hereinafter, exemplary embodiments in the present disclosure will be described in detail with reference to the attached drawings such that the present disclosure can be easily put into practice by those skilled in the art. As those skilled in the art would realize, the described embodiments may be modified in various different ways, all without departing from the spirit or scope of the present disclosure. The drawings are to be regarded as illustrative in nature and not restrictive. Like reference numerals designate like elements throughout the specification. Further, a detailed description of well-known technology will be omitted.

In this specification, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function and operation and can be implemented by hardware components or software components and combinations thereof.

In this specification, a "mobile device" provides an audio or audiovisual communication function and a data communication function, is a portable device that can be connected to a voice recognition system of a vehicle through a wire and wireless communication network, and may include, for example, a cellular phone, a personal digital assistant (FDA), a smart phone, or a wearable device, In this specification, 'terminal information' includes a telephone directory in which a mobile device provides and identification information of the mobile device, The telephone directory includes data, such as a name, a title, a company name, a group, a phone number, an e-mail address, or an address, In this specification, it is assumed that an automatic dialing system is in a connection state to a first mobile device of a plurality of mobile devices in which a driver has through a wireless communication network.

FIG. 1 is a block diagram illustrating a configuration of an automatic dialing system according to an exemplary embodiment in the present disclosure.

An automatic dialing system 100 of FIG. 1 includes a telephone directory receiving unit 110, a telephone directory database 120, an instruction receiving unit 130, a telephone directory search unit 140, a mobile device determination unit 150, a mobile device connection unit 160, a dialing guide unit 170, and a dialing control unit 180.

The telephone directory receiving unit 110 receives a telephone directory transmitted from a first mobile device that is connected through a wireless communication network. In this case, the first mobile device is connected to the automatic dialing system 100 through a short range wireless communication network such as Bluetooth, Zigbee, or Wi-Fi.

The telephone directory database 120 stores terminal information of a plurality of mobile devices in which a driver has. According to the present disclosure, the telephone directory database 120 stores the telephone directory transmitted from the first mobile device that is received through the telephone directory receiving unit 110 and identification information of the first mobile device. Further, the telephone directory database 120 stores the entire telephone directory provided from a mobile device having connection history to the automatic dialing system 100 and identification information of the mobile device having the connection history. Here, the identification information is a media access control (MAC) address.

FIG. 2 is a diagram illustrating a telephone directory database according to an exemplary embodiment in the present disclosure.

Referring to FIG. 2, a telephone directory database stores a telephone directory that is transmitted from a mobile device A, identification information (MAC address) corresponding to the mobile device A, a telephone directory that is transmitted from a mobile device B, and identification information (MAC address) corresponding to the mobile device B.

Referring back to FIG. 1, the instruction receiving unit 130 receives a driver's dialing instruction. Here, the instruction receiving unit 130 receives a driver's voice instruction. For example, the instruction receiving unit 130 extracts a characteristic vector of the received voice instruction and performs voice recognition based on the extracted characteristic vector and a previously stored audio model. The voice instruction includes a name, a title, or a company name that is stored at the telephone directory. Further, the instruction receiving unit 130 receives a dialing instruction that is input by the driver through Is an input device connected to the automatic dialing system 100 through a wired or wireless communication network.

The telephone directory search unit 140 searches for a telephone directory including an instruction that is received through the instruction receiving unit 130.

The mobile device determination unit 150 determines whether a mobile device corresponding to a telephone directory that is found through the telephone directory search unit 140 corresponds with the first mobile device connected to the automatic dialing system 100. If the mobile device corresponding to the telephone directory that is found through the telephone directory search unit 140 corresponds with the first mobile device that is connected to the automatic dialing system 100, the dialing guide unit 170 outputs a dialing guide message.

If a mobile device corresponding to the telephone directory that is found through the telephone directory search unit 140 does not correspond with the first mobile device connected to the automatic dialing system 100, the mobile device connection unit 160 connects the mobile device corresponding to the found telephone directory and the automatic dialing system 100 through the communication network. According to the present disclosure, the mobile device connection unit 160 releases the connection of the automatic dialing system 100 and the first mobile device and connects the mobile device corresponding to the found telephone directory and the automatic dialing system 100 through the wireless communication network. Here, the mobile device connection unit 160 connects the mobile device and the automatic dialing system 100 through the wireless communication network using a MAC address of the mobile device corresponding to the found telephone directory.

The dialing guide unit 170 outputs the dialing guide message. When a mobile device corresponding to the found telephone directory corresponds with the first mobile device, the dialing guide unit 170 outputs an instruction receive result of the instruction receiving unit 130 and a dialing guide message, Further, when the mobile device corresponding to the found telephone directory and the automatic dialing system 100 are connected through the wireless communication network, the dialing guide unit 170 outputs connection information of the mobile device corresponding to the found telephone directory and a dialing guide message as an instruction reception result of the instruction receiving unit 130. Further, when a telephone directory including an instruction that is received through the instruction receiving unit 130 is not found, the dialing guide unit 170 outputs an error message.

The dialing control unit 180 dials a phone number corresponding to an instruction received through the instruction receiving unit 130 using the first mobile device or a mobile device corresponding to the found telephone directory.

Figure 3:
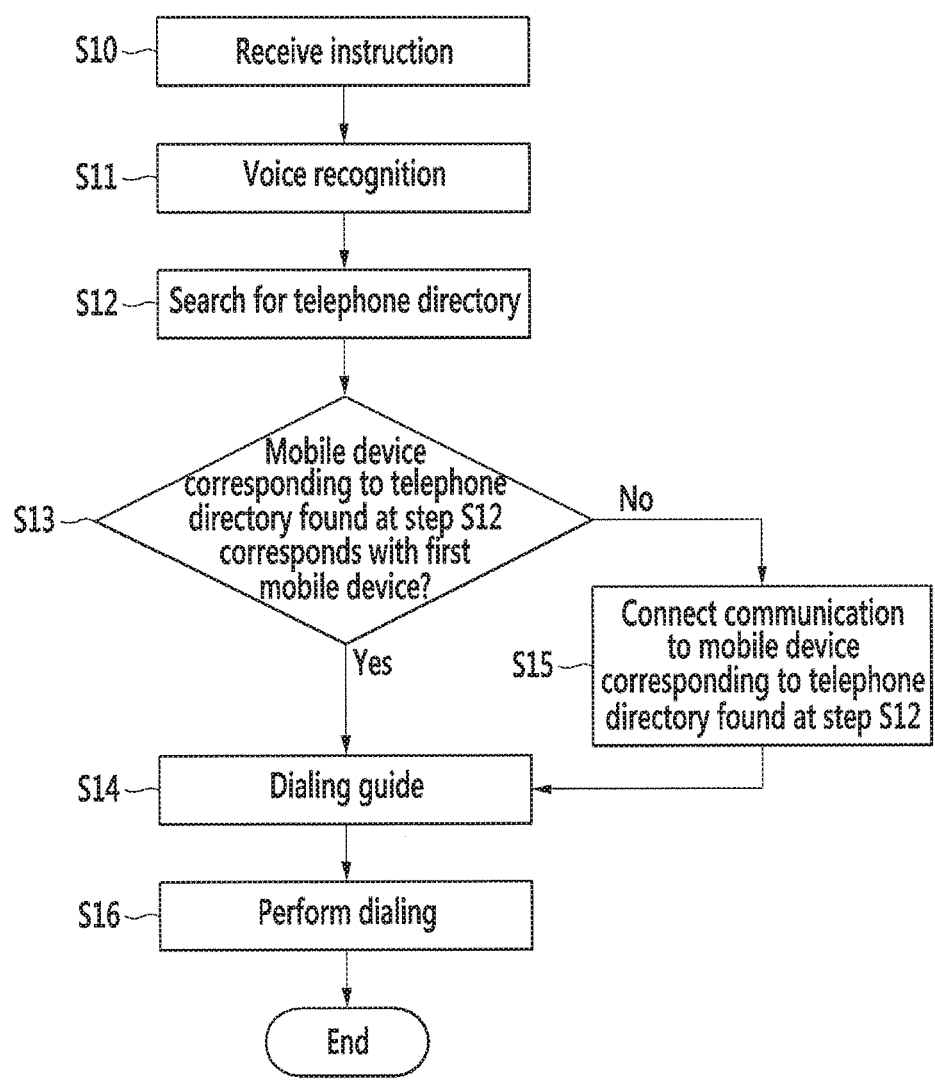
FIG. 3 is a flowchart illustrating an automatic dialing method using the automatic dialing system of FIG. 1.

FIG. 3 is a flowchart illustrating an automatic dialing method using the automatic dialing system of FIG. 1. FIG. 3 illustrates a method of automatically dialing based on a driver's voice instruction recognition result.

First, the instruction receiving unit 130 receives the driver's instruction (S10) and performs voice recognition of the instruction that is received at step S10 (S11).

Thereafter, the telephone directory search unit 140 searches for a telephone directory including a voice recognition result of step S11 (S12). For example, with reference to FIG. 2, when the voice recognition result of step S11 is '○○○', at step S12, a telephone directory of a mobile device A including '○○○' is searched for.

Thereafter. the mobile device determination unit 150 determines whether a mobile device corresponding to the telephone directory that is found at step S12 corresponds with a first mobile device connected to the automatic dialing system 100 (S13).

If the mobile device corresponding to the telephone directory that is found at step S12 corresponds with the first mobile device, the dialing guide unit 170 outputs the voice recognition result and a dialing guide message (S14). For example, the dialing guide unit 170 may output a message 'A phone call will be connected to ○○○' through a voice or an image.

If the mobile device corresponding to the telephone directory that is found at step S12 does not correspond with the first mobile device, the mobile device connection unit 160 connects the mobile device corresponding to the telephone directory and the automatic dialing system 100 through a wireless communication network (S15). At step S15, the mobile device may be connected to the automatic dialing system 100 using a MAC address of the mobile device corresponding to the telephone directory.

When the mobile device corresponding to the telephone directory and the automatic dialing system 100 are connected, the dialing guide unit 170 outputs the voice recognition result, connection information, and the dialing is guide message. For example, the dialing guide unit 170 may output a message 'A connection to the mobile device is complete, and a phone call will be connected to ○○○' through a voice or an image.

Thereafter, the dialing control unit 180 dials a phone number corresponding to the voice recognition result of step S11 using the first mobile device or the mobile device corresponding to the telephone directory (S16).

According to an exemplary embodiment in the present disclosure, among a plurality of mobile devices in a vehicle, a mobile device that stores the driver's voice instruction is searched for, When the found mobile device is not connected to the automatic dialing system, connection to a previously connected mobile device is released. Then, the found mobile device and the automatic dialing system are automatically connected, and calling to a phone number corresponding to a voice instruction can be performed. Accordingly, when the driver having the plurality of mobile devices uses the dialing system, user convenience can be improved.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An automatic dialing system connected to a first mobile device among a plurality of mobile devices, which include the first mobile device and a second mobile device, the automatic dialing system comprising:
   a telephone directory database configured to store first terminal information which comprises a first telephone directory and first identification information corresponding to the first mobile device and second terminal information which comprises a second telephone directory and second identification information corresponding to the second mobile device; and
   a processor including:
      an instruction receiving unit configured to receive a voice dialing instruction;
      a telephone directory search unit configured to search for a telephone directory based on the received voice dialing instruction;
      a mobile device connection unit configured to connect the first mobile device to the automatic dialing system, and release connection between the first mobile device and the automatic dialing system and connect the second mobile device to the automatic dialing system when the found telephone directory does not correspond with the first telephone directory but corresponds with the second telephone directory; and
      a dialing control unit configured to dial a phone number corresponding to the received voice dialing instruction through the first mobile device when the found telephone directory corresponds with the first telephone directory, and dial a phone number corresponding to the received voice dialing instruction through the second mobile device when the found telephone directory corresponds with the second telephone directory,
      wherein the mobile device connection unit connects the second mobile device to the automatic dialing system through a communication network based on the second identification information, when the found telephone directory corresponds with the second telephone directory.

2. The automatic dialing system of claim 1, wherein the instruction receiving unit receives the voice dialing instruction as a driver's voice instruction and performs voice recognition.

3. The automatic dialing system of claim 1, wherein the first identification information and the second identification information are media access control (MAC) addresses.

4. The automatic dialing system of claim 1, wherein the processor further comprises:
   a dialing guide unit configured to output connection information of the second mobile device and dialing information as a reception result of the voice dialing instruction when the found telephone directory corresponds with the second telephone directory.

5. The automatic dialing system of claim 1, wherein the processor further comprises:
   a dialing guide unit configured to output connection information of the first mobile device and dialing information as a reception result of the voice dialing instruction when the found telephone directory corresponds with the first telephone directory.

6. A non-transitory computer readable recording medium that stores a program having instructions that, when executed by a processor, performs an automatic dialing method using an automatic dialing system that is connected to a first mobile device of a plurality of mobile devices, which include the first mobile device and a second mobile device, by causing the processor to perform steps comprising:
   storing first terminal information that includes a first telephone directory and first identification information which correspond to the first mobile device, and second terminal information that includes a second telephone directory and second identification information which correspond to the second mobile device;
   receiving a voice dialing instruction;
   searching for a telephone directory based on the received voice dialing instruction;
   connecting the first mobile device to the automatic dialing system;
   releasing connection between the first mobile device and the automatic dialing system and connecting the second mobile device to the automatic dialing system, when the found telephone directory does not correspond with the first telephone directory but corresponds with the second telephone directory;
   dialing a phone number corresponding to the received voice instruction through the first mobile device, when the found telephone directory corresponds with the first telephone directory; and
   dialing a phone number corresponding to the received voice dialing instruction through the second mobile device, when the found telephone directory corresponds with the second telephone directory,
   wherein the step of connecting comprises connecting the second mobile device to the automatic dialing system based on second identification information, when the found telephone directory corresponds with the second telephone directory.

7. The computer readable recording medium of claim 6, wherein the step of receiving the voice dialing instruction comprises receiving and recognizing a driver's voice instruction.

8. The computer readable recording medium of claim 6, wherein the first identification information and the second identification information include media access control (MAC) addresses.

9. The computer readable recording medium of claim 6, further comprising outputting connection information of the second mobile device and dialing information as a reception result of the voice dialing instruction, when the found telephone directory corresponds with the second telephone directory.

* * * * *